Patented Jan. 25, 1938

UNITED STATES PATENT OFFICE 2,106,196

PROCESS FOR REMOVING AND/OR PREVENTING THE DEPOSITION OF SCALE IN EVAPORATORS

Charles Fitch Weston, Prince George County, Va., assignor, by mesne assignments, to The Solvay Process Company, New York, N. Y., a corporation of New York No Drawing. Application November 25, 1932, Serial No. 644,329

14 Claims. (Cl. 23—102)

This invention relates to a process for preventing the deposition of scale and/or for removing scale deposited from heated aqueous liquors containing calcium or magnesium and bicarbonate ions, and particularly to a process for preventing the deposition of scale and/or removing scale deposited from solutions of alkali metal nitrates such as sodium or potassium nitrate containing calcium or magnesium and bicarbonate ions during the evaporation of such solutions.

An alkali metal nitrate may be produced for example, by absorbing nitrogen oxides in a solution of sodium carbonate to give in the later stages of the absorption a nitrate solution containing free nitric acid. This sodium nitrate solution frequently contains calcium and/or magnesium ions which may originate either in the soda ash or in the water used for making up the soda ash solutions in which the nitrogen oxides are absorbed. Before evaporation the acid liquor is usually made slightly alkaline with sodium carbonate to obviate the corrosive action of an acid liquor on the evaporators. When the alkaline liquor, now containing calcium and/or magnesium ions and bicarbonate ions, is evaporated, calcium and magnesium compounds deposit as scale on the heating surfaces of the evaporator and materially affect the efficiency of the evaporation process.

I have found that by preventing the presence of or removing bicarbonate ions present in the solutions during their evaporation, the deposition of scale may be prevented and further, that calcium and magnesium scales which may have been previously deposited on the surfaces of the evaporator may be removed, and that these results may be readily accomplished by having present in the liquor to be evaporated an ammonium salt in sufficient quantity. I have further found that in evaporating solutions of soluble materials which crystallize solid from the solution undergoing concentration, the deposition of scale may be prevented by having present in the solution an ammonium salt during the first stages of the evaporation of the solution and that in a later stage of the evaporation, particularly in the last stage wherein crystals are formed and a mixture of crystals and mother liquor is being concentrated, the liquor may be freed of ammonium salt without a scale depositing during the final heating and concentration.

It is accordingly an object of this invention to provide a process whereby the deposition of scale from aqueous liquors being heated may be prevented and particularly for preventing scale deposition from alkali metal nitrate solutions during concentration which solutions contain calcium and/or magnesium ions and bicarbonate ions. It is a further object of this invention to provide a process whereby calcium and/or magnesium scale on evaporator surfaces may be readily removed therefrom.

In carrying out this invention a liquor containing calcium or magnesium and bicarbonate ions is heated with an ammonium salt of an acid forming salts of calcium and magnesium more soluble than calcium or magnesium carbonate, the ammonium salt being present in amount in excess of that equivalent to the carbonate which is present in the solution, both as normal carbonate and as bicarbonate. By heating the solution containing an ammonium salt such as, for example, ammonium nitrate, the solution may be concentrated in contact with heat transfer surfaces without a scale containing calcium or magnesium depositing upon the surfaces of the evaporator and, if such a scale deposit is already present upon the evaporator surfaces, it is removed in the course of evaporating the solution containing an excess of the ammonium salt.

Further, in carrying out this invention, a solution of a soluble material containing calcium or magnesium and bicarbonate ions is heated with an ammonium salt as described above, thereby preventing the deposition of scale during the concentration of the liquor. The concentrated liquor is then treated to decompose the ammonium salt present, for example by heating with an addition of a soluble basic material such as sodium or potassium hydroxide or carbonate in amount sufficient to decompose the ammonium salt in the concentrated liquor, and this heating of the liquor is preferably carried out with solid particles of the dissolved material, which have crystallized from solution, in suspension in the liquor.

It is believed that the process of this invention depends for its effectiveness in preventing the deposition of or removing scale during the evaporation of a solution, upon the removal from the solution of bicarbonate and carbonate ions in accordance with the equations—

(I) 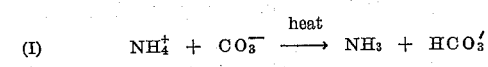

(II) 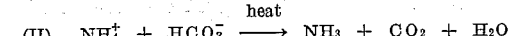

It is further believed that the prevention of scale deposition from the liquor in the final stages of evaporation, and particularly where a mixture of crystals and mother liquor is being concentrated, with no ammonium salt present and with calcium and/or magnesium ions present, is a result of one or both of the following factors: the solid crystals in suspension in mother liquor may have a scouring action on the evaporator surfaces as the mixture of mother liquor and crystals is agitated during the heating which prevents insoluble calcium and/or magnesium compounds which are thrown out of solution from depositing as a scale upon the heating surfaces and/or, the addition of sodium carbonate, for example, to the liquor containing calcium and/or magnesium salts may form a precipitate of calcium or magnesium carbonate, but such precipitate forms in the body of liquor and under such circumstances does not form a scale on the evaporator surfaces. In offering the foregoing theories of the actions by which the deposition of scale is prevented in carrying out my process, it is not intended that my invention should be limited thereto, since the reasons for no scale forming in my process are not known with certainty.

The following example is illustrative of a method for carrying out the process of this invention: A sodium nitrate solution containing free nitric acid and calcium and/or magnesium compounds, is treated with ammonia which, by reaction with the nitric acid contained in the solution, introduces into the solution a proportion of ammonium nitrate. To the thus treated solution sodium carbonate is added in amount sufficient to render the liquor slightly alkaline and the liquor now containing bicarbonate ions is concentrated in a three-effect multiple-stage evaporator in which the solution is passed through externally heated coils or nests of tubes. The proportions of ammonia and sodium carbonate employed in the preparation of the liquor for evaporation are regulated so that the ammonium nitrate is in excess of the amount corresponding to the carbonate as represented by the equations—

$$NH_4NO_3 + MHCO_3 = MNO_3 + NH_3 + CO_2 + H_2O$$

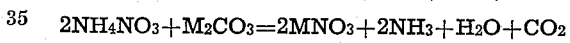
$$2NH_4NO_3 + M_2CO_3 = 2MNO_3 + 2NH_3 + H_2O + CO_2$$

in which M represents a metal or metal radical. For example, the solution before evaporation may contain about 0.5 gram per liter of carbonates calculated as $CO_2$ and 2 grams per liter of ammonium nitrate. The solution may then be evaporated, during which the ammonium nitrate acts to prevent deposition of scale on the heat transfer surfaces of the evaporator or, if calcium or magnesium scale has already been formed upon the evaporator surfaces, this scaly deposit will be removed. During the final step of concentration (for example, in the third stage of a three-stage evaporator), in which crystals of sodium nitrate separate out from the solution and the material undergoing concentration is a mixture of solid crystalline sodium nitrate and mother liquor, an alkaline compound such as sodium hydroxide or sodium carbonate is added to the solution in amount sufficient to react with the excess ammonium nitrate present to convert it into sodium nitrate in accordance with the reaction

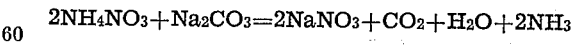
$$2NH_4NO_3 + Na_2CO_3 = 2NaNO_3 + CO_2 + H_2O + 2NH_3$$

During the final concentration of the liquor the ammonia and carbon dioxide are evolved from the solution and a liquor obtained which is free from ammonium salts, and from which an ammonia-free sodium nitrate may be recovered by concentration and crystallization, without a scale depositing in the tubes of the third stage of the evaporator. If desired, a slight excess of the sodium carbonate may be added over that required for reaction with the ammonium nitrate so that the liquor after evaporation contains a small amount of sodium carbonate. The liquor thus concentrated may be cooled to crystallize out additional sodium nitrate, or without cooling the mother liquor may be separated from the sodium nitrate crystals and returned, together with fresh sodium nitrate liquor and with the introduction of the desired proportion of ammonium salt, for evaporation and recovery of additional sodium nitrate.

Instead of introducing the ammonium nitrate into the sodium nitrate solution by passing ammonia into an acidic solution, this may likewise be accomplished by dissolving ammonium nitrate itself in the liquor. Not only ammonium nitrate but other ammonium salts such as ammonium chloride or sulfate, the corresponding calcium and magnesium salt of the acid radical of which are more soluble than calcium and magnesium carbonates, may be utilized in accordance with the process of this invention.

I claim:

1. In a process for evaporating a solution of an alkali metal nitrate containing calcium or magnesium and bicarbonate ions, that improvement which comprises introducing into the solution to be evaporated an ammonium salt of an acid, the calcium and magnesium salts of which are more soluble than calcium and magnesium carbonate, said salt being in amount in excess of that equivalent to the carbonate present in the solution and heating the liquor to evaporate it in contact with heat transfer surfaces.

2. In a process for evaporating solutions of sodium nitrate containing calcium or magnesium and bicarbonate ions, that improvement which comprises introducing into the solution to be evaporated an ammonium salt of an acid, the calcium and magnesium salts of which are more soluble than calcium and magnesium carbonate, said salt being in amount in excess of that equivalent to the carbonate present and heating the solution to evaporate it in contact with heat transfer surfaces.

3. In a process for the recovery of sodium nitrate wherein a solution of sodium nitrate containing calcium or magnesium and bicarbonate ions is evaporaated, that improvement which comprises introducing into the solution to be evaporated an ammonium salt of an acid the calcium and magnesium salts of which are more soluble than calcium and magnesium carbonate, said salt being in excess of that equivalent to the carbonate present, evaporating the solution in contact with heat transfer surfaces and then introducing into the evaporated solution a sodium base in amount at least sufficient to react with the residual ammonium salt present and heating the thus treated solution until residual ammonium salt is substantially decomposed.

4. In a process for the recovery of sodium nitrate from a solution thereof containing calcium or magnesium and bicarbonate ions, that improvement which comprises introducing into the solution ammonium nitrate in excess of that equivalent to the carbonate present, evaporating the solution in contact with heat transfer surfaces, and then introducing into the evaporated solution sodium carbonate in amount sufficient to react with the residual ammonium nitrate present in the solution and heating the thus treated solution to decompose the ammonium salt until the solution is substantially free from ammonium salt.

5. In a process for evaporating solutions of alkali metal nitrates containing calcium or magnesium and bicarbonate ions to crystallize solid alkali metal nitrate from solution that improvement which comprises introducing into the solution to be evaporated an ammonium salt of an acid, the calcium and magnesium salts of which are more soluble than calcium and magnesium carbonate, said salt being in amount in excess of that equivalent to the carbonate present in the solution, heating the liquor in contact with heat transfer surfaces to evaporate it and crystallize solid alkali metal nitrate from solution, and in a stage of said heating wherein the liquor contains solid crystallized alkali metal nitrate heating the mixture of solid and mother liquor in the presence of a basic compound of said alkali metal until the residual ammonium salt in the mixture is substantially and completely decomposed.

6. In a process for evaporating solutions of sodium nitrate containing calcium or magnesium and bicarbonate ions by heating the solution in stages wherein the solution is passed through externally heated tubes and is concentrated to crystallize solid sodium nitrate during evaporation that improvement which comprises introducing into the solution to be evaporated ammonium nitrate in excess of that equivalent to the carbonate present, evaporating the solution containing said ammonium nitrate and in a stage of the evaporation where a mixture of mother liquor and crystallized sodium nitrate is being heated adding an alkaline sodium compound to the liquor in amount sufficient to react with the ammonium nitrate present to decompose substantially completely said ammonium nitrate.

7. In a process for the evaporation of a solution of an alkali metal nitrate containing calcium or magnesium and bicarbonate ions in contact with heat transfer surfaces, the method of preventing the deposition of scale on said heat transfer surfaces which comprises introducing into said solution an ammonium salt of an acid the calcium and magnesium salts of which are more soluble than calcium and magnesium carbonate, said ammonium salt being in excess of that equivalent to the carbonate present, evaporating the solution in contact with heat transfer surfaces until solid alkali metal nitrate crystallizes therefrom, then introducing alkali metal carbonate into the resulting mixture of solid and mother liquor in amount at least sufficient to react with the residual ammonium salt present, and heating the thus treated mixture in contact with heat transfer surfaces until said residual ammonium salt in the mixture is substantially completely decomposed.

8. The process for removing calcium or magnesium carbonate scale from heat exchange surfaces which comprises heating a solution of an alkali metal nitrate containing an ammonium salt of an acid the calcium and magnesium salts of which are more soluble than calcium and magnesium carbonate while maintaining the heated solution in contact with the scale on said surfaces, said ammonium salt being present in the solution in amount in excess of that equivalent to carbonate dissolved in the solution during the contact of the solution with said scale.

9. The process for the production of an ammonia-free alkali metal nitrate by evaporation to crystallization of a solution of alkali metal nitrate containing calcium or magnesium ions in contact with heat exchange surfaces and simultaneously preventing the deposition of scale on said surfaces which comprises introducing into said solution an ammonium salt of an acid the calcium and magnesium salts of which are more soluble than calcium and magnesium carbonate, adding to the solution alkali metal carbonate in amount sufficient to render the solution alkaline, the amounts of said ammonium salt and carbonate being such that the solution contains an excess of the ammonium salt, heating the solution in contact with said heat exchange surfaces to concentrate it, and then adding to the thus concentrated solution a basic compound of an alkali metal and heating the solution to decompose substantially completely the residual ammonium salt contained therein.

10. In a process for evaporating a solution of an alkali metal nitrate containing calcium or magnesium and bicarbonate ions, that improvement which comprises introducing into the solution to be evaporated ammonium nitrate in amount in excess of that equivalent to the carbonate present in the solution and heating the liquor to evaporate it in contact with heat transfer surfaces.

11. In a process for evaporating solutions of sodium nitrate containing calcium or magnesium and bicarbonate ions, that improvement which comprises introducing into the solution to be evaporated ammonium nitrate in amount in excess of that equivalent to the carbonate present and heating the solution to evaporate it in contact with heat transfer surfaces.

12. In a process for the recovery of sodium nitrate wherein a solution of sodium nitrate containing calcium or magnesium and bicarbonate ions is evaporated, that improvement which comprises introducing into the solution to be evaporated ammonium nitrate in amount in excess of that equivalent to the carbonate present, evaporating the solution in contact with heat transfer surfaces and then introducing into the evaporated solution a sodium base in amount at least sufficient to react with the residual ammonium salt present and heating the thus treated solution until residual ammonium salt in the solution is substantially completely decomposed.

13. In a process for evaporating solutions of alkali metal nitrates containing calcium or magnesium and bicarbonate ions to crystallize solid alkali metal nitrate from solution that improvement which comprises introducing into the solution to be evaporated ammonium nitrate in amount in excess of that equivalent to the carbonate present in the solution, heating the liquor in contact with heat transfer surfaces to evaporate it and crystallize solid alkali metal nitrate from solution, and in a stage of said heating wherein the liquor contains solid crystallized alkali metal nitrate, heating the mixture of solid and mother liquor in the presence of a basic compound of said alkali metal until the residual ammonium salt in the mixture is substantially completely decomposed.

14. The process for removing calcium or magnesium carbonate scale from heat exchange surfaces which comprises heating a solution of an alkali metal nitrate containing ammonium nitrate while maintaining the heated solution in contact with the scale on said surfaces, said ammonium nitrate being present in the solution in amount in excess of that equivalent to carbonate dissolved in the solution during the contact of the solution with said scale.

CHARLES FITCH WESTON.